United States Patent
Weber et al.

(10) Patent No.: US 9,631,548 B2
(45) Date of Patent: Apr. 25, 2017

(54) INTERNAL COMBUSTION ENGINE WHICH CAN BE OPERATED WITH LIQUID AND WITH GASEOUS FUEL AND A METHOD FOR OPERATING AN INTERNAL COMBUSTION ENGINE OF THIS KIND

(71) Applicant: Ford Global Technologies, LLC, Dearborn, MI (US)

(72) Inventors: Carsten Weber, Leverkusen (DE); Ulrich Kramer, Bergisch Gladbach (DE); Martin Wirth, Remscheid (DE)

(73) Assignee: Ford Global Technologies, LLC, Dearborn, MI (US)

(*) Notice: Subject to any disclaimer, the term of this patent is extended or adjusted under 35 U.S.C. 154(b) by 392 days.

(21) Appl. No.: 14/032,092

(22) Filed: Sep. 19, 2013

(65) Prior Publication Data
US 2014/0102405 A1    Apr. 17, 2014

(30) Foreign Application Priority Data

Oct. 16, 2012 (DE) .................. 10 2012 218 789

(51) Int. Cl.
*F02B 17/00* (2006.01)
*F02D 13/02* (2006.01)
(Continued)

(52) U.S. Cl.
CPC ........ *F02B 17/005* (2013.01); *F02D 13/0203* (2013.01); *F02D 15/00* (2013.01);
(Continued)

(58) Field of Classification Search
CPC .... F02B 17/005; F02D 13/0203; F02D 15/00; F02D 19/0647; F02D 19/0689;
(Continued)

(56) References Cited

U.S. PATENT DOCUMENTS 6,209,516 B1 *  4/2001  Yamashita ............ F02D 41/401
                                                    123/305
6,286,482 B1 *  9/2001  Flynn ....................... F02B 1/12
                                                    123/25 C
(Continued)

FOREIGN PATENT DOCUMENTS

CN       101571076 A    11/2009
DE       10162797 A1     7/2003
(Continued)

OTHER PUBLICATIONS

Partial Translation of Office Action of Chinese Patent Application No. 201310483354.1, Issued Jan. 5, 2017, State Intellectual Property Office of PRC, 9 pages.

*Primary Examiner* — Hung Q Nguyen
*Assistant Examiner* — Brian P Monahon
(74) *Attorney, Agent, or Firm* — Julia Voutyras; McCoy Russell LLP

(57) ABSTRACT

The application describes a system for an engine comprising a direct injection nozzle for injecting gaseous fuel into a cylinder of an engine in a second operating mode; an intake injection nozzle for injecting liquid fuel into an intake port of the engine in a first operating mode; and a valve gear suitable to adjust timing of opening and closing of an inlet valve. Preferential injection of a gaseous fuel such as compressed natural gas directly into the cylinder increases efficiency and allows for reduced heat exposure to the lesser used liquid gas injectors mounted in the intake port, reducing coking of these injectors.

16 Claims, 4 Drawing Sheets

(51) Int. Cl.
*F02D 15/00* (2006.01)
*F02D 19/06* (2006.01)
(52) U.S. Cl.
CPC ..... *F02D 19/0644* (2013.01); *F02D 19/0647* (2013.01); *F02D 19/0689* (2013.01); *Y02T 10/18* (2013.01); *Y02T 10/36* (2013.01)
(58) Field of Classification Search
CPC ...... F02D 19/0644; Y02T 10/36; Y02T 10/18; F02M 69/044
USPC .......................... 123/304, 698, 445, 525, 577
See application file for complete search history.

(56) References Cited

U.S. PATENT DOCUMENTS

| | | | | |
|---|---|---|---|---|
| 6,658,845 | B1* | 12/2003 | Sun | F02D 13/0249 60/601 |
| 7,284,506 | B1* | 10/2007 | Sun | F02D 19/0692 123/1 A |
| 2005/0091965 | A1* | 5/2005 | Ries-Mueller | F02B 39/10 60/277 |
| 2005/0155344 | A1* | 7/2005 | Kobayashi | F02B 1/12 60/286 |
| 2006/0225703 | A1* | 10/2006 | Saito | F02D 41/047 123/431 |
| 2007/0056537 | A1* | 3/2007 | Morimasa | F01L 1/053 123/90.15 |
| 2007/0119415 | A1* | 5/2007 | Lewis | F01N 11/007 123/295 |
| 2009/0276142 | A1* | 11/2009 | Leone | F02D 13/0215 701/103 |
| 2010/0116232 | A1* | 5/2010 | Toda | F02D 13/0226 123/90.17 |
| 2010/0175644 | A1* | 7/2010 | Shinagawa | F02D 13/0234 123/90.15 |
| 2010/0211297 | A1* | 8/2010 | Doering | F02D 13/06 701/112 |
| 2010/0217504 | A1* | 8/2010 | Fujii | F01L 1/344 701/105 |
| 2010/0229838 | A1* | 9/2010 | Sturman | F01L 1/28 123/525 |
| 2010/0318284 | A1* | 12/2010 | Surnilla | F02B 17/005 701/113 |
| 2011/0132285 | A1* | 6/2011 | Pursifull | F01N 5/02 123/3 |
| 2011/0132323 | A1* | 6/2011 | Surnilla | F02D 19/0644 123/406.19 |
| 2011/0174268 | A1* | 7/2011 | Surnilla | F02D 35/027 123/406.29 |
| 2012/0041665 | A1* | 2/2012 | Pursifull | F01B 1/02 701/103 |
| 2012/0210981 | A1* | 8/2012 | Ulrey | F02D 19/0694 123/456 |
| 2013/0255646 | A1* | 10/2013 | Ulrey | F02D 41/0027 123/527 |
| 2014/0102405 | A1* | 4/2014 | Weber | F02B 17/005 123/295 |
| 2014/0238340 | A1* | 8/2014 | Dunn | F02M 43/00 123/299 |
| 2015/0025777 | A1* | 1/2015 | Pursifull | F02M 43/00 701/104 |

FOREIGN PATENT DOCUMENTS

| | | |
|---|---|---|
| DE | 69735846 T2 | 10/2006 |
| DE | 102010048823 A1 | 4/2012 |
| EP | 1154134 A2 | 11/2001 |
| EP | 1520962 A1 | 4/2005 |
| WO | 2013075234 A1 | 5/2013 |

* cited by examiner

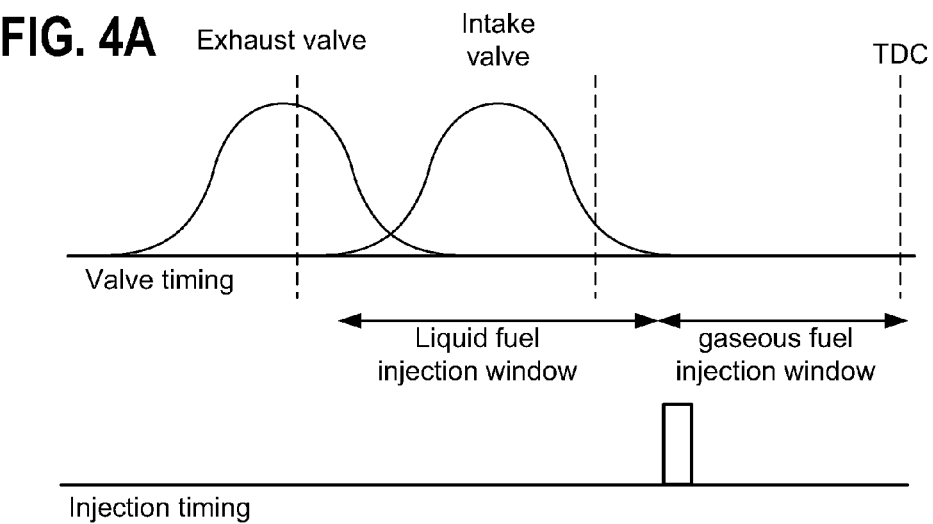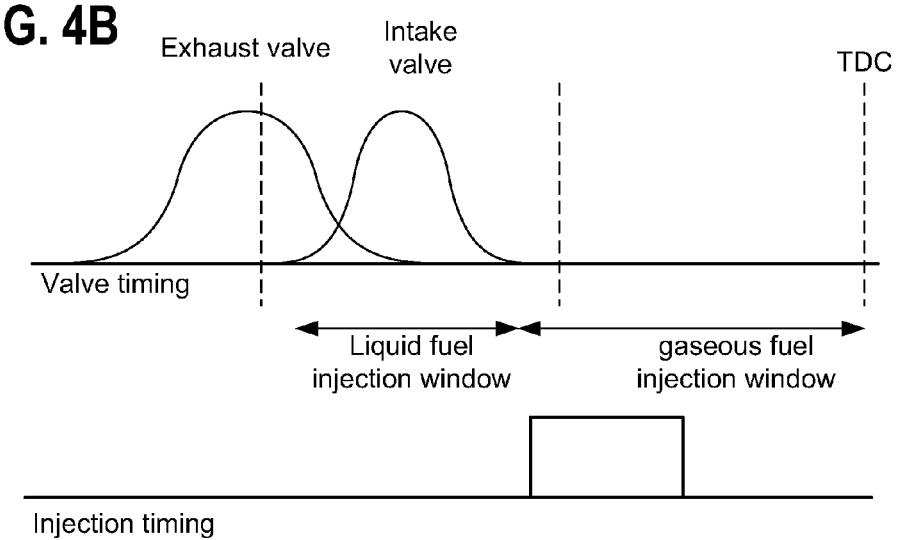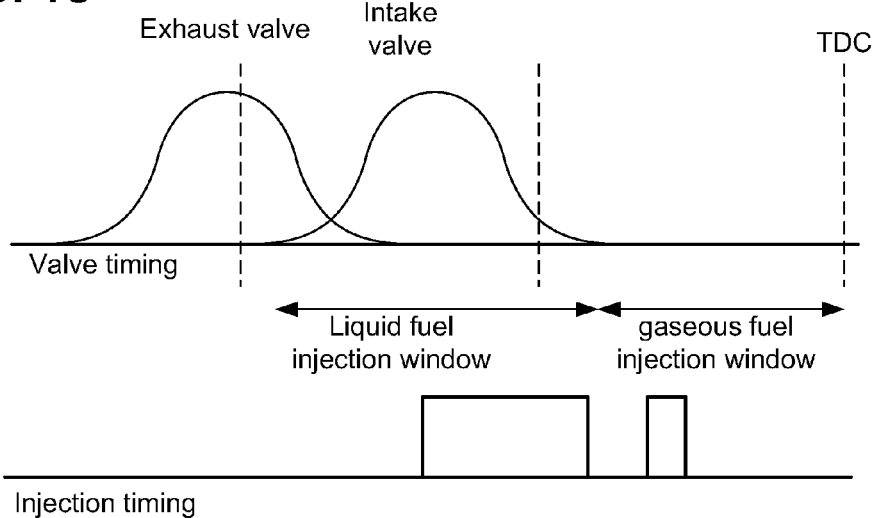

INTERNAL COMBUSTION ENGINE WHICH CAN BE OPERATED WITH LIQUID AND WITH GASEOUS FUEL AND A METHOD FOR OPERATING AN INTERNAL COMBUSTION ENGINE OF THIS KIND

CROSS REFERENCE TO RELATED APPLICATIONS

The present application claims priority to German Patent Application 102012218789.8, filed on Oct. 16, 2012, the entire contents of which are hereby incorporated by reference for all purposes.

TECHNICAL FIELD

The disclosure relates to an internal combustion engine which can be operated with liquid fuel in a first operating mode and with gaseous fuel in a second operating mode.

BACKGROUND AND SUMMARY

With increasingly stringent emissions and efficiency regulations there is an increasing push toward the use of alternative fuels in internal combustion engines. In the context of the present disclosure, the term "internal combustion engine" comprises applied-ignition Otto engines especially. In the case of Otto engines, for example, not only gasoline as the traditional Otto engine fuel but also, for example, liquefied gas (LPG—Liquefied Petroleum Gas), a propane/butane mixture, which is also referred to as autogas, or natural gas (CNG—Compressed Natural Gas), primarily methane, are being used as fuels. Hydrogen ($H_2$), ethanol or fuel mixtures consisting of gasoline and ethanol are further examples of alternative fuels.

In the case of the internal combustion engine which forms the subject matter of the present disclosure, not only a liquid fuel, e.g. the traditional Otto engine fuel, but also a gaseous fuel, e.g. natural gas, is used as a fuel for operating the internal combustion engine, wherein, in the context of the present disclosure, the term "gaseous fuel" is used when the fuel is in the gaseous phase under ambient conditions.

Since different fuels have different physical and chemical properties, the internal combustion engine may be designed specifically for the fuel used. In this context, adaptation of the operating parameters of the internal combustion engine, e.g. of the ignition point and of the injection point, may be required. The timings, the boost pressure, the cooling water temperature, the injection duration, the charge air quantity, and also design parameters, e.g. the compression ratio, can be, and frequently are, designed for operation with a particular fuel. The fuel used also affects the design configuration of the fuel supply system of the internal combustion engine, in particular the injection system used to introduce the fuel.

A fundamental distinction may be drawn here between two concepts of fuel injection, namely intake pipe injection and direct injection. In the case of intake pipe injection, the Otto engine operates with a substantially homogeneous fuel/air mixture, which is prepared by external mixture formation in a process in which fuel is introduced into the induced charge air in the at least one intake line of the intake system. The load is adjusted by modifying the fill of the cylinder, e.g. by means of quantity control, the usual method used with Otto engines, generally by means of a throttle valve provided in the intake line. By adjusting the throttle valve, the pressure of the induced air downstream of the throttle valve can be reduced to a greater or lesser extent. The further the throttle valve is closed, e.g. the more the intake line is blocked, the higher is the pressure loss in the induced air across the throttle valve and the lower is the pressure of the induced air downstream of the throttle valve before entry to the cylinder. With a constant combustion chamber volume, it is possible in this way, using the pressure of the induced air, to adjust the air mass, e.g. the quantity. This method of load control proves particularly disadvantageous in the part-load range since low loads require severe throttling and a large pressure reduction in the induced air. This results in high pumping losses. In order to reduce these throttling losses, e.g. these pumping losses, various concepts have been developed.

Injecting fuel directly into the combustion chamber of the at least one cylinder is regarded as a suitable measure for dethrottling the internal combustion engine and making a noticeable reduction in fuel consumption, even in the case of Otto engines. By means of direct injection, it is possible to achieve a stratified combustion chamber charge and hence, within certain limits, quality control. Moreover, exploiting the enthalpy of vaporization of the fuel introduced directly into the combustion chamber results in an internal cylinder cooling effect which allows a further increase in efficiency by raising the compression ratio.

The disadvantage with direct injection is that there is relatively little time available for injection of the fuel, mixture preparation in the combustion chamber, namely preparation of the fuel, possibly by vaporization, mixing of the charge air and the fuel and ignition of the prepared mixture. Otto-cycle processes which employ direct injection are therefore significantly more sensitive to changes and deviations in mixture formation, especially during injection and during ignition, than Otto-cycle processes which employ intake pipe injection.

The prior art includes internal combustion engines in which intake pipe injection for introducing gaseous fuel into the intake system and direct injection for introducing liquid fuel into the at least one cylinder are provided. Such an injection concept for an internal combustion engine which can be operated alternately by means of liquid or gaseous fuel has a large number of disadvantages, which will be briefly explored below.

Different sorts of fuel have different levels of resistance to knock, these being indicated by the octane ratings RON and MON. The compression ratio $\varepsilon$ of the Otto engine, e.g. the compression ratio $\varepsilon$ of the at least one cylinder, may therefore be designed for the fuel with the lower knock resistance. In general, the liquid fuel is the fuel with the lower knock resistance. A relatively high compression ratio which allows problem-free operation of the internal combustion engine with the gaseous fuel can then lead to knocking in the case of operation with liquid fuel. Since knocking or spontaneous ignition has to be reliably avoided, the internal combustion engine may be designed for the fuel with the lower knock resistance.

It should be noted in this context that the efficiency $\eta$ of the internal combustion engine correlates more or less with the compression ratio $\varepsilon$, e.g. efficiency $\eta$ is greater at a higher compression ratio $\varepsilon$ and lower at a lower compression ratio $\varepsilon$. The fact that the internal combustion engine has to be provided with a lower compression ratio $\varepsilon$ to match the fuel with the lower knock resistance has the effect that the efficiency that could theoretically be obtained with the use of the gaseous fuel cannot be achieved, e.g. the actual efficiency potential of the gaseous fuel is not exhausted.

Introducing the gaseous fuel into the intake system of the internal combustion engine by means of intake pipe injection has the effect that the high-pressure gas in the intake system expands before and during its introduction into the at least one cylinder in the course of exhaust and refill. In the case of internal combustion engines pressure-charged by means of exhaust gas turbocharging, in particular, this has the disadvantageous effect that the turbocharger may perform additional volumetric work in order to recompress the gas that has expanded in the intake system. In order to introduce the same mass of mixture into the cylinder, a higher boost pressure is therefore also required.

Since the internal combustion engine is preferably operated with gaseous fuel or is to be operated with gaseous fuel whenever, as soon as and for as long as gaseous fuel is available, the second operating mode is the preferred operating mode, and hence the operating mode which is to be used more frequently in normal operation of the internal combustion engine.

This has the effect that the injection device, e.g. an injection nozzle, arranged in the combustion chamber of the at least one cylinder in order to introduce the liquid fuel is unused for relatively long phases. Without continuous use of the injection nozzle for the purpose of fuel injection, the lack of the cooling which is generally brought about by the fuel introduced may lead to high temperatures in areas of the injection nozzle which face or are adjacent to the combustion chamber. The high temperatures can lead to thermal overloading of the nozzle and also to coking, with even very small quantities of fuel left behind on the injection device during injection burning incompletely if there is a deficiency of oxygen.

Deposits of coking residues form on the injection device. On the one hand, these coking residues can modify the geometry of the injection device in a disadvantageous way and affect or hinder the formation of the injection jet, thereby noticeably disrupting mixture preparation. On the other hand, fuel injected in the first operating mode is deposited in the porous coking residues and then often burns incompletely if there is a deficiency of oxygen, forming soot which, in turn, contributes to an increase in particulate emissions.

Moreover, coking residues may break away, owing, for example, to mechanical stress due to a pressure wave propagating in the combustion chamber or the action of the injection jet. The residues broken away in this way can lead to damage in the exhaust system and can, for example, impair the ability to function of exhaust gas aftertreatment systems provided in the exhaust system.

Owing to the high temperatures, coke deposits may also form within the nozzle, and these can not only affect or hinder the formation of the injection jet and disrupt mixture preparation but, what is more, can jeopardize the ability to function of the nozzle overall.

The effects and actions described above have the effect that the internal combustion engine may generally be operated in the first, liquid fuel operating mode in order to counteract damage to the nozzle or problems due to coking. This is not conducive to operation of the internal combustion engine in the second, gaseous fuel operating mode as frequently and for as long as possible.

The inventors recognized the above described disadvantages and disclose a system and method for prevention of coking residues as described below. According to the disclosure, in contrast to the prior art, the gaseous fuel is injected directly into the cylinder when the internal combustion engine is in the second operating mode, whereas the liquid fuel is introduced into the intake system by means of intake pipe injection if the internal combustion engine is being operated in the first operating mode.

The present disclosure describes a system for an engine comprising a direct injection nozzle for injecting gaseous fuel into a cylinder of an engine in a second operating mode; an intake injection nozzle for injecting liquid fuel into an intake port of the engine in a first operating mode; and a valve gear suitable to adjust timing of opening and closing of an inlet valve. Preferential injection of a gaseous fuel such as compressed natural gas directly into the cylinder increases efficiency and allows for reduced heat exposure to the lesser used liquid gas injectors mounted in the intake port, reducing coking of these injectors.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

BRIEF DESCRIPTION OF THE DRAWINGS

FIGS. 4A-C shows valve and injection timing under different load or torque scenarios.

DETAILED DESCRIPTION

Figure 1:
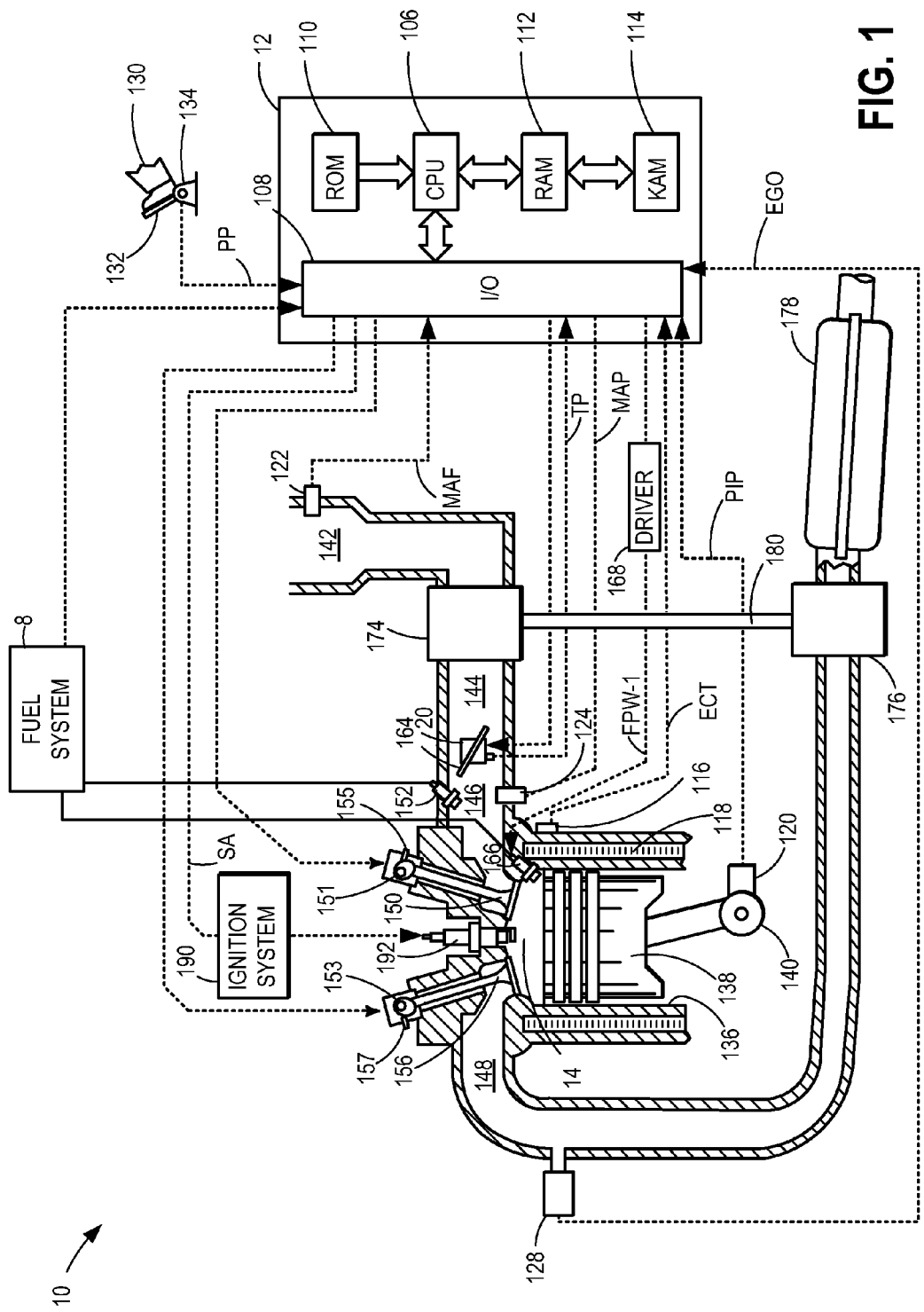
FIG. 1 shows a diagram of an example cylinder of an internal combustion engine
Figure 2:
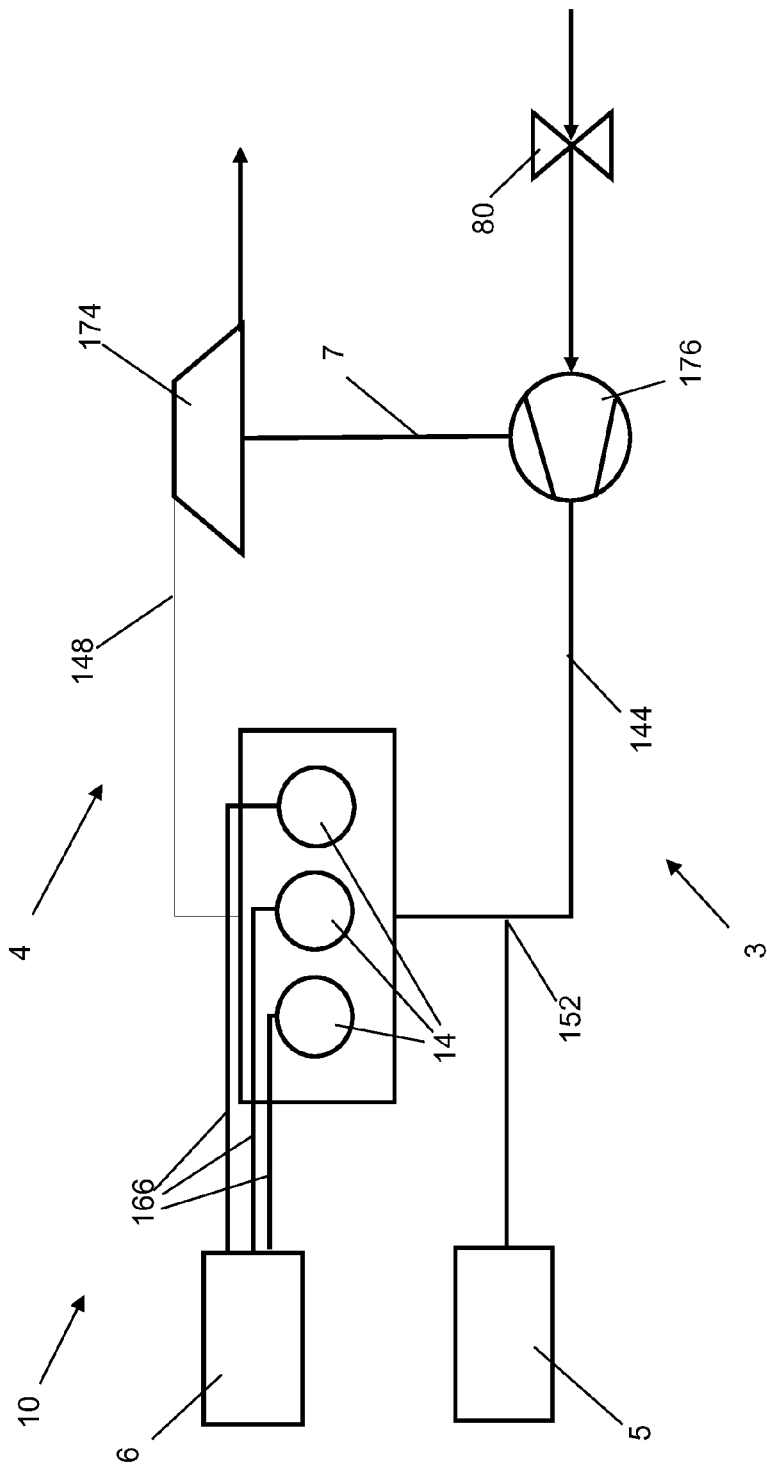
FIG. 2 shows a diagram of a first embodiment of the internal combustion engine.
Figure 3:
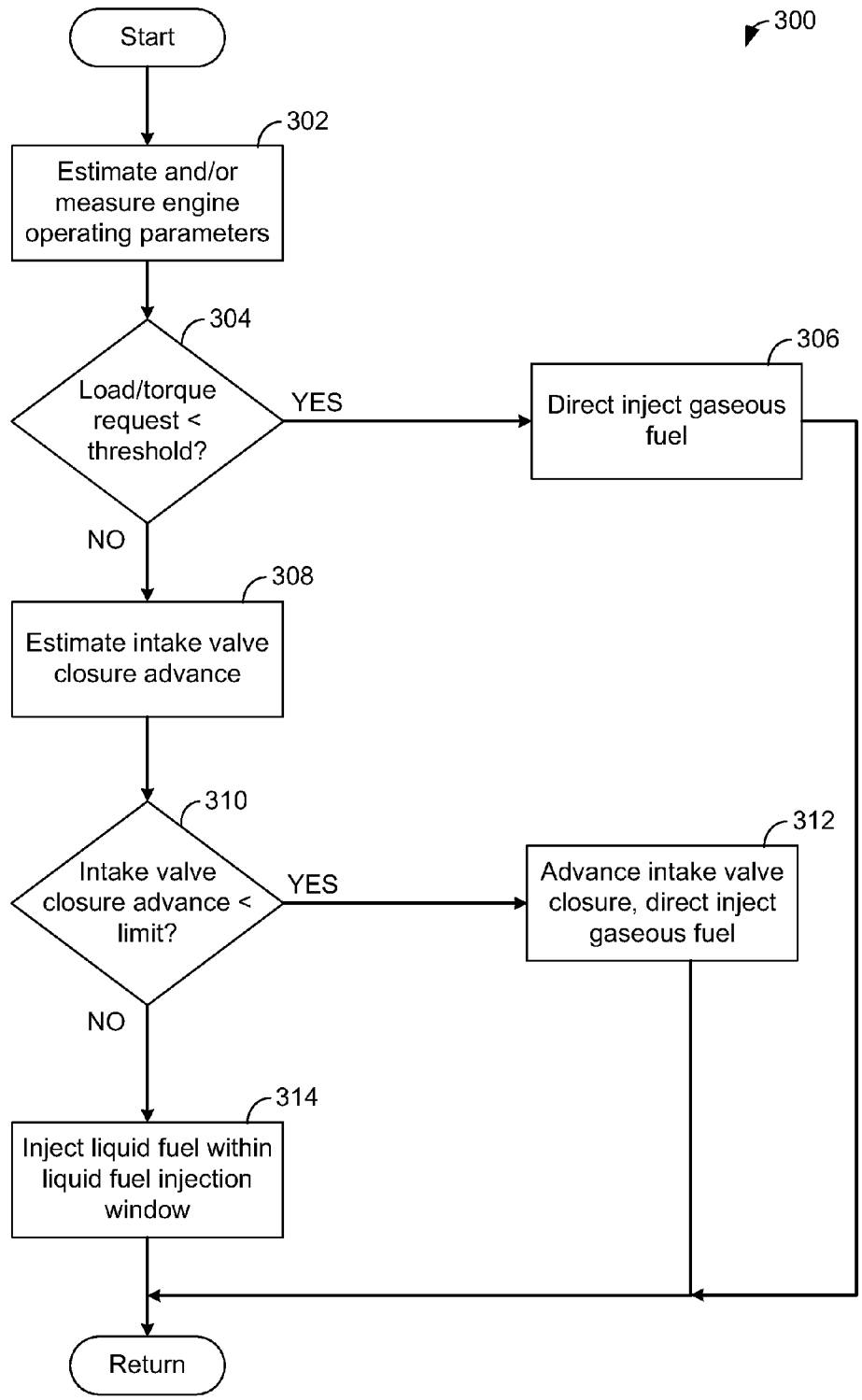
FIG. 3 shows a method of selecting between a first and second mode of operation.

The disclosure is described in greater detailed below in reference to the drawings. An example cylinder in accordance with the present disclosure is shown in FIG. 1 with an overview of the separate fuel tanks and injection systems shown in FIG. 2. FIG. 3 details a method by which an operating mode for the engine described in FIGS. 1 and 2 may be selected. FIG. 4 shows a method of operating an engine in a first and second operating mode once a mode has been determined.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Embodiments of the internal combustion engine in which at least one pressure-charging device is provided are advantageous.

In particular, embodiments of the internal combustion engine in which at least one exhaust gas turbocharger comprising a compressor arranged in the intake system is provided are advantageous. The associated turbine is arranged in the exhaust system.

The advantage of the exhaust gas turbocharger in comparison with a mechanical charger, for example, is that there is no need for a mechanical connection for power transmission between the charger and the internal combustion engine. Whereas a mechanical charger draws the energy required to drive it from the internal combustion engine and hence reduces the power supplied and in this way has a disadvantageous effect on efficiency, the exhaust gas turbocharger uses the exhaust gas energy of the hot exhaust gases.

Pressure-charged internal combustion engines are preferably fitted with a charge air cooling system by means of which the compressed charge air is cooled before entry to the cylinders. This increases the density of the charge air fed in. In this way, cooling contributes to compression and to increased filling of the cylinders. It may be advantageous to fit the charge air cooler with a bypass line in order to be able to bypass the charge air cooler when required, e.g. after a cold start.

Pressure charging is a suitable means of boosting the power of an internal combustion engine while keeping the swept volume unchanged, or of reducing the swept volume for the same power. In either case, pressure charging leads to an increase in power per unit volume and a more favorable power-to-mass ratio. Given identical vehicle boundary conditions, the load population can thus be shifted toward higher loads, at which specific fuel consumption is lower.

The fundamental aim of designing a turbocharging system is to achieve a noticeable increase in power in all engine speed ranges. Often, a severe drop in torque is observed when the engine speed falls below a certain level. The torque characteristic of a pressure-charged internal combustion engine can be increased by various measures, e.g. by providing a plurality of chargers, exhaust gas turbochargers and/or mechanical chargers, arranged in parallel and/or in series.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Embodiments of the internal combustion engine in which at least one exhaust gas aftertreatment system is provided in the exhaust system are advantageous; e.g. an oxidation catalyst, a three-way catalyst, a storage catalyst, a selective catalyst and/or a particulate filter.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more inlet valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Inlet valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more valve gears comprising cam profile switching (CPS), variable cam timing (VCT), variable valve timing (VVT) and/or variable valve lift (VVL) systems that may be operated by controller 12 to vary valve operation. Such a valve gear may be able to alter a valve closing time independently from a valve opening time and vice versa. The operation of inlet valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an inlet valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Embodiments of the internal combustion engine in which a valve gear comprising at least one inlet valve for the at least one inlet port and a valve actuating device for actuating said at least one inlet valve is provided, the valve gear being embodied so as to be adjustable in such a way that the time at which the at least one inlet valve closes can be modified, are advantageous.

One such valve gear is, for example, the VALVETRONIC valve gear made by BMW, as described in Motortechnische Zeitung, 2001, Volume 6, page 18. In this valve gear, the closing time of the inlet valve and the inlet valve stroke can be varied. Dethrottled and therefore low-loss load control is thereby possible. Here, the mass of mixture or mass of charge air flowing into the combustion chamber during the intake process is not controlled, e.g. metered, by means of a throttle valve arranged in the intake section, as in conventional Otto engines, but by means of the inlet valve stroke and the opening duration of the inlet valve.

An only partially variable valve gear in which only the closing time of the inlet valve can be modified can be used not only to dethrottle the internal combustion engine but also to modify the effective compression ratio $\epsilon$ of the at least one cylinder and hence to adapt the compression ratio to the respective fuel or the knock resistance thereof.

In this context, embodiments of the internal combustion engine in which the valve gear is embodied so as to be adjustable in such a way that the time at which the at least one inlet valve closes can be modified without changing the opening time at which said inlet valve opens are advantageous.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14 . . . . While FIG. 1 shows injector 166 as a side injector, it may also be located overhead of the piston, such as near the position of spark plug 192. The engine may also be equipped with a port injector 152. Fuel may be delivered to fuel injector 166 and port injector 152 from a high pressure fuel system 8 including fuel tanks, fuel pumps, and a fuel rail. Fuel system 8 may comprise a separate fuel tank for liquid and gaseous fuel that may separately feed direct injection system 166 and port injection system 152 as shown in FIG. 2. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

In addition to the fuel tank, the injection nozzles and a fuel pump for delivering the fuel and for generating the necessary injection pressure, the main components of fuel supply systems for internal combustion engines with intake pipe injection include a fuel supply line which connects the various components to one another and, more specifically, extends from the fuel tank as far as the injection nozzles.

Fuel supply systems for direct-injection internal combustion engines have not only the actual low-pressure fuel pump but also a second pump, namely a high-pressure pump. While the high-pressure pump ensures the required high injection pressures, the actual fuel pump serves as a "priming pump" for filling the high-pressure pump. The high-pressure pump requires additional driving power that has to be provided by the internal combustion engine, reducing the effective efficiency. In the internal combustion engine according to the disclosure, this high-pressure pump can be omitted since the liquid fuel is injected into the intake pipe, for which purpose the fuel pump referred to above as a priming pump is sufficient. The gaseous fuel is injected directly into the cylinder, using the pressure prevailing in the gas tank.

As described above, FIG. 1 shows only one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Turning now to FIG. 2, an embodiment of the internal combustion engine 10 is shown which can be operated either with liquid fuel or with gaseous fuel. This is a three-cylinder in-line engine, in which the three cylinders 14 are arranged along the longitudinal axis of the cylinder head, e.g. in line.

An exhaust line 148 is provided for discharging the hot exhaust gases via an exhaust system 4a, and an intake line 144 is provided for supplying the three cylinders 14 with charge air or fresh mixture via an intake system 3. A throttle valve 80, which is subject to open-loop or closed-loop control (not shown) by means of an engine controller, is provided in the intake line 144 for adjusting the load.

For the purpose of pressure charging, the internal combustion engine 1 is fitted with an exhaust gas turbocharger 174, with the turbine 176 being arranged in the exhaust line 148 of the exhaust system 4a, and the compressor 176 of the exhaust gas turbocharger 7 being arranged in an intake line 144 of the intake system 3. The charge air fed to the internal combustion engine 10 is compressed in the compressor 176, for which purpose the enthalpy of the exhaust gas is used in the turbine 174.

To introduce gaseous fuel directly into the cylinders 14, e.g. to form a direct injection system 166, each cylinder 14 is fitted with a dedicated injector, which is activated, e.g. controlled (not shown), by means of the engine controller. The quantity of gas injected is used to set the air ratio 2.

The internal combustion engine 10 is furthermore fitted with an intake pipe injection system 152 for introducing liquid fuel into the intake system 3, by means of which liquid fuel is introduced into the intake line 144 upstream of the cylinders 14. The quantity of fuel injected is once again used to set the air ratio 2. Separate tanks 5, 6 are provided for storing the gaseous fuel and the liquid fuel respectively.

The engine according to the present disclosure may be operated with liquid fuel in a first operating mode and with gaseous fuel in a second operating mode, and in which the at least one cylinder has at least one inlet port, to which is connected an intake line for feeding in charge air via an intake system comprising a direct injection system is provided for introducing gaseous fuel into the at least one cylinder, and an intake pipe injection system is provided for introducing liquid fuel into the intake system.

According to the disclosure, in contrast to the prior art, the gaseous fuel is injected directly into the cylinder when the internal combustion engine is in the second operating mode, whereas the liquid fuel is introduced into the intake system by means of intake pipe injection if the internal combustion engine is being operated in the first operating mode.

The injection concept according to the disclosure has several advantages at once. On the one hand, intake pipe injection of the liquid fuel has the advantage that the injection device that has to be provided for introducing the liquid fuel is no longer exposed to the high temperatures that occur in the combustion chamber. The risk of thermal overloading of the injection device, e.g. overheating, especially as a result of non-use during the second operating mode of the internal combustion engine and the absence of cooling in that case, no longer exists. Problems relating to coking of the injection device may be mitigated by the arrangement of the injection device in the region of the intake system upstream of the at least one cylinder.

On the other hand, intake pipe injection of the liquid fuel in the first operating mode enables the internal combustion engine to be operated in the preferred second operating mode for as frequently and as long as possible, e.g. as extensively as possible. The internal combustion engine can be operated with gaseous fuel in an unrestricted manner without the risk of overheating or coking of the injection device.

Moreover, direct injection of the gaseous fuel into the at least one cylinder has the effect that the efficiency potential of the gaseous fuel can be fully exhausted and exploited since the geometric compression ratio & of the internal combustion engine or of the cylinder can be designed for the gaseous fuel and hence for the fuel with the higher knock resistance and, at the same time, measures are envisaged and offered by means of which the compression ratio in the first operating mode can be matched to the liquid fuel or the knock resistance thereof.

As will be described further below in conjunction with the preferred embodiments of the internal combustion engine, the compression ratio $\epsilon$ can be adapted, e.g. varied, both by modifying the geometric compression ratio and by adjusting, e.g. modifying, the effective compression ratio.

By virtue of the fact that the gaseous fuel is injected directly into the at least one cylinder, the expansion of the high-pressure gas, in particular into the intake system, can be attenuated or prevented if, for example, the inlet side of the cylinder is closed before the gaseous fuel is introduced into the cylinder. The high-pressure gas expands in the cylinder and, in this way, it assists mixture formation and mixture preparation. In the case of internal combustion engines with exhaust gas turbocharging, the additional volumetric work that has to be performed by the turbocharger according to the prior art is thus eliminated.

By means of the internal combustion engine according to the disclosure, the first partial object underlying the disclosure is achieved, e.g. an internal combustion engine is provided which is optimized in respect of its operating behavior and by means of which the problems and disadvantages known from the prior art can be eliminated.

Turning now to FIG. 3 a method of selecting a mode of operation is depicted. The method 300 starts at 302 where engine operating parameters are estimated and/or measured. The method proceeds to 304 where it is determined is a load or torque request is less than a threshold. The threshold may be based on engine operating conditions such as air-fuel ratio or engine speed to achieve a certain load or torque output. Furthermore, in embodiments where an effective compression ratio within the cylinder is variable the compression ratio along with EGR rate or turbocharger rates may be considered in determining the threshold load or torque request for a given set or parameters. A lookup table with specific parameters and a concomitant load of torque threshold may be saved in read only memory 110 for example.

If the load or torque request is below a threshold (YES) the method proceeds to 306 where the engine operates under the second mode of operation and gaseous fuel is injected directly into the cylinder (see FIG. 4A). If the load or torque request is not below a threshold (NO) the method proceeds to 308 where the inlet valve closure advance needed to accommodate an increased fuel injection is estimated (see FIG. 4B). Fuel quantity may increase with an increase in the load or torque request. As gaseous fuel is injected after inlet valve closure inlet valve closure may be advanced to allow for increased injection duration.

At 310, it is determined if the inlet valve closure advance is less than a predetermined limit. As the inlet valve closure advances to accommodate an increased injection duration corresponding to an increased load or torque request there may be a point at which inlet valve closure may not advance further as air intake would be adversely affected. This point may be the predetermined limit of inlet valve closure advance. Furthermore, fuel injection may not extend beyond a certain time within the compressions stroke as time for adequate mixing of air and fuel may not occur before ignition. If the inlet valve closure advance is less than the limit (YES) the method proceeds to 312 where the inlet valve closure is advanced using a valve gear as described in reference to 151 in FIG. 1 and gaseous fuel is injected directly into the cylinder in the second mode of operation.

If at 310, if inlet valve closure advance is not less than the limit and thus is beyond the limit (NO) the method proceeds to 314. At 314, liquid fuel is injected via intake injection in the first operating mode (see FIG. 4C), with an optional additional gaseous injection). The method then returns.

Turning now to FIGS. 4A-C, an example diagram of valve opening and fuel injection is shown. In the example of FIG. 4A load or torque request is below a threshold. Below the load or torque request threshold the engine may function in the second mode of operation.

In FIG. 4B a load or torque request exceeds a threshold and inlet valve closure is advanced to compensate for increased injection duration. In this case gaseous fuel injection directly into the cylinder in the $2^{nd}$ mode of operation may not negatively impact air intake and may still fall within the gaseous fuel injection window.

In FIG. 4C the load or torque request has reached a point at which inlet valve closure has advanced to its limit and may not be further advanced without negatively impacting air intake, and thus combustion. At this point the engine switched to a first mode of operating and liquid fuel is injected into the intake port of the engine during the liquid fuel injection window.

Since the internal combustion engine is preferably operated with gaseous fuel or is to be operated with gaseous fuel whenever, as soon as and for as long as gaseous fuel is available, the second operating mode is the preferred operating mode, and hence the operating mode which is to be used more frequently in normal operation of the internal combustion engine.

In practice, a changeover between the injection methods is generally affected by using different characteristic maps for direct injection, on the one hand, and intake pipe injection, on the other hand. The changeover can be associated, in particular, with a change in the ignition point or start of injection but also with adaptation of the injection duration.

Embodiments of the internal combustion engine in which the compression ratio $\epsilon$ of the at least one cylinder can be modified are advantageous.

A variable compression ratio $\epsilon$ allows adaptation of the compression ratio $\epsilon$ to the respective fuel and hence, on the one hand, allows operation of the internal combustion engine with a higher compression ratio in order to be able fully to exploit the efficiency potential of the gaseous fuel and, on the other hand, allows operation of the internal combustion engine with a lower compression ratio in order reliably to prevent knocking combustion when using the—liquid—fuel with the lower knock resistance.

Embodiments of the internal combustion engine in which the following applies for the compression ratio $\epsilon$ of the at least one cylinder, at least in the second operating mode: $10<\epsilon<16$, are advantageous.

In particular, embodiments of the internal combustion engine in which the following applies for the compression ratio $\epsilon$ of the at least one cylinder, at least in the second operating mode: $11<\epsilon<5$, preferably: $12<\epsilon<14$, are advantageous.

Embodiments of the internal combustion engine in which the following applies for the compression ratio $\epsilon$ of the at least one cylinder, at least in the second operating mode: $13<\epsilon<16$, are advantageous.

As regards the above embodiments, it should be taken into account that the efficiency $\eta$ of the internal combustion engine is correlated with the compression ratio $\epsilon$, e.g. as the compression ratio $\epsilon$ becomes greater, the efficiency $\eta$ likewise increases. As regards efficiency $\eta$, as high as possible a compression ratio $\epsilon$ is advantageous.

Embodiments of the internal combustion engine in which the geometric compression ratio $\epsilon$ of the at least one cylinder can be modified are advantageous. The compression ratio may be modified by altering the time at which the least one inlet valve opens and closes by using a variable valve gear. In some embodiments, altering inlet valve open duration may comprise adjusting an inlet valve closing time independent of an inlet valve opening time.

The compression ratio $\epsilon$, especially when the internal combustion engine is in operation, can be modified by means of a large number of different concepts.

One way of obtaining a variable compression ratio $\epsilon$ comprises embodying the connecting rod as a two-part connecting rod. Here, the connecting rod comprises an upper connecting rod, which is connected in an articulated manner to the piston, and a lower connecting rod, which is connected in an articulated manner to the crankshaft, with the upper connecting rod and the lower connecting rod likewise being connected to one another in an articulated manner in order in this way to enable them to be pivoted relative to one another. The length of the connecting rod is modified by pivoting the two connecting rods relative to one another. Here, the compression ratio $\epsilon$ is adjusted by means of a link rod which is connected in an articulated manner to the upper connecting rod and is mounted rotatably on an eccentric shaft supported in the crankcase. The compression ratio can be varied within wide limits, e.g. between $\epsilon_{min}\approx 8$ and $\epsilon_{max}\approx 15$, by turning the eccentric shaft, which results in changes to the dead center positions.

Another way of obtaining a variable compression ratio $\epsilon$ comprises supporting the crankshaft in eccentric bushings. The position of the crankshaft relative to the cylinder head is varied by turning the eccentric bushings, leading to variation of the geometric compression ratio.

Concepts in which an eccentric bushing is provided in the small or large connecting rod eye as an intermediate element of the bearing assembly are advantageous. The eccentric bushing is capable of being turned, e.g. can be switched in steps between different working positions, with the different compression ratios $\epsilon$ resulting from the different dead center positions of the piston being obtained in the different working positions of the eccentric bushing.

Embodiments of the internal combustion engine in which the effective compression ratio $\epsilon$ of the at least one cylinder can be modified are also advantageous.

As will become clear in conjunction with the previous embodiments, modification of the geometric compression ratio ∈ can be very involved and complex and hence also costly. It may therefore be advantageous to modify not the geometric compression ratio but instead the effective compression ratio, e.g. to adapt the knock resistance of the fuel that is currently being used.

As already mentioned, this can be accomplished, for example, by varying the closing time of at least one inlet valve, wherein either an advance of the closing time or a retardation can ensure a reduction in or can be used to reduce the compression ratio by reducing the effective swept volume.

In the case of internal combustion engines with a variable valve gear on the inlet side, by means of which the closing time of the at least one inlet valve can be modified, method variants in which the closing time of the at least one inlet valve is modified in order to modify the effective compression ratio ∈ of the at least one cylinder are advantageous.

In the case of internal combustion engines with a variable valve gear on the inlet side, by means of which the closing time of the at least one inlet valve can be modified, method variants in which the closing time of the at least one inlet valve is modified in order to dethrottle the internal combustion engine are also advantageous.

In this context, embodiments of the method in which the closing time of the at least one inlet valve is retarded in order to reduce the effective compression ratio ∈ of the at least one cylinder and/or to dethrottle the internal combustion engine are advantageous.

However, embodiments of the method in which the closing time of the at least one inlet valve is advanced in order to reduce the effective compression ratio ∈ of the at least one cylinder and/or to dethrottle the internal combustion engine can also be advantageous.

Method variants in which natural gas is used as the gaseous fuel for the internal combustion engine are advantageous.

Embodiments of the method in which the gas used as a gaseous fuel for the internal combustion engine is introduced in the gaseous phase into the at least one cylinder by means of direct injection, using the pressure present in the gas tank, are advantageous.

Compared with intake pipe injection, direct injection of the gas into the at least one cylinder has fundamental advantages in respect of the maximum achievable power if the turbocharger has only to compress the charge air required for the fresh charge for the cylinder, and the gaseous fuel is injected or blown in only after the inlet has been closed.

Notwithstanding the above, embodiments of the method in which the gas used as a gaseous fuel for the internal combustion engine is introduced in the liquid phase into the at least one cylinder by means of direct injection can also be advantageous.

In this case, heat is additionally withdrawn from the mixture during the vaporization of the fuel. This has an advantageous effect on knock sensitivity and hence on the ignition point to be set, thereby making it possible, in turn, to increase the achievable efficiency.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
   a cylinder comprising an inlet port;
   a direct injection system for introducing gaseous fuel, which is in a gaseous phase under ambient conditions, into the cylinder;
   an intake pipe injection system for introducing liquid fuel into an intake pipe; and
   a processor with instructions stored in memory, including instructions to:
      when an engine load or torque request is less than a threshold, inject the gaseous fuel into the cylinder via the direct injection system and not inject the liquid fuel via the intake pipe injection system; and
      when the engine load or torque request is greater than the threshold, estimate a closure advance of an inlet valve needed to accommodate an increased gaseous fuel injection duration corresponding to the engine load or torque request, and if the estimated inlet valve closure advance is greater than a predetermined limit, inject the liquid fuel into the intake pipe via the intake pipe injection system without advancing the inlet valve closure.

2. The internal combustion engine as claimed in claim 1, further comprising a valve gear comprising the inlet valve for the inlet port and a valve actuating device for actuating the inlet valve, wherein the valve gear is configured to adjust a time at which the inlet valve closes without changing an opening time at which the inlet valve opens.

3. The internal combustion engine as claimed in claim 1, further comprising a compression ratio of the cylinder which can be modified.

4. The internal combustion engine as claimed in claim 3, wherein the compression ratio is modified by altering a time at which the inlet valve opens and closes.

5. The internal combustion engine as claimed in claim 3, wherein the compression ratio falls between 10 and 16.

6. The internal combustion engine as claimed in claim 3, wherein the compression ratio falls between 11 and 15.

7. The internal combustion engine as claimed in claim 3, wherein the compression ratio falls between 12 and 14.

8. The internal combustion engine as claimed in claim 1, further comprising at least one exhaust gas turbocharger.

9. A method for operating an internal combustion engine comprising:
during engine operation in a second operating mode in which an engine load or torque request is less than a threshold, controlling an inlet valve via a controller to close an inlet port of a cylinder before controlling a direct injector via the controller to introduce gaseous fuel, which is in a gaseous phase under ambient conditions, into the cylinder; and
during engine operation in a first operating mode in which the engine load or torque request is greater than the threshold, estimating an inlet valve closure advance needed to accommodate an increased gaseous fuel injection duration corresponding to the engine load or torque request, and if the estimated inlet valve closure advance exceeds a predetermined limit, controlling the inlet valve via the controller to keep the inlet port of the cylinder open while controlling a port injector via the controller to inject liquid fuel into the inlet port of the cylinder without advancing the inlet valve closure.

10. The method as claimed in claim 9, further comprising, via the controller, altering an open duration of the inlet valve using a variable valve gear.

11. The method as claimed in claim 10, wherein altering the open duration of the inlet valve comprises adjusting a closing time of the inlet valve via the controller.

12. The method as claimed in claim 9, further comprising reducing a compression ratio of the cylinder during engine operation in the second operating mode by retarding a closing time of the inlet valve via the controller.

13. The method as claimed in claim 9, further comprising reducing a compression ratio of the cylinder during engine operation in the second operating mode by advancing a closing time of the inlet valve via the controller.

14. The method as claimed in claim 9, further comprising using natural gas as the gaseous fuel for the internal combustion engine.

15. A system comprising:
a direct injection nozzle for injecting compressed natural gas into a cylinder of an engine;
an intake injection nozzle for injecting liquid fuel into an intake port of the engine;
a valve gear suitable to adjust timing of opening and closing of an inlet valve;
a turbocharger; and
a processor with instructions stored in memory, including instructions to:
during engine operation with an engine load or torque request below a predetermined threshold, inject the compressed natural gas into the cylinder via the direct injection nozzle and not inject the liquid fuel into the intake port via the intake injection nozzle; and
during engine operation with the engine load or torque request above the predetermined threshold:
estimate an inlet valve closure advance needed to accommodate an increased gaseous fuel injection duration corresponding to the engine load or torque request,
if the estimated inlet valve closure advance does not exceed a predetermined limit, advance inlet valve closure with the estimated inlet valve closure advance, inject the compressed natural gas into the cylinder via the direct injection nozzle, and not inject the liquid fuel into the intake port via the intake injection nozzle, and
if the estimated inlet valve closure advance exceeds the predetermined limit, inject the liquid fuel into the intake port via the intake injection nozzle without advancing the inlet valve closure.

16. The system of claim 15, wherein the liquid fuel comprises liquefied petroleum gas.

* * * * *